(12) United States Patent
Gomaa et al.

(10) Patent No.: US 10,655,443 B2
(45) Date of Patent: *May 19, 2020

(54) PULSED HYDRAULIC FRACTURING WITH GEOPOLYMER PRECURSOR FLUIDS

(71) Applicant: Saudi Arabian Oil Company, Dhahran (SA)

(72) Inventors: Ahmed M. Gomaa, Khobar (SA); Khalid R. Alnoaimi, Khobar (SA); Ghaithan A. Al-Muntasheri, Khobar (SA)

(73) Assignee: Saudi Arabian Oil Company, Dhahran (SA)

(\*) Notice: Subject to any disclaimer, the term of this patent is extended or adjusted under 35 U.S.C. 154(b) by 0 days.

This patent is subject to a terminal disclaimer.

(21) Appl. No.: 15/711,889

(22) Filed: Sep. 21, 2017

(65) Prior Publication Data
US 2019/0085675 A1 Mar. 21, 2019

(51) Int. Cl.
*E21B 43/267* (2006.01)
*C09K 8/80* (2006.01)
(Continued)

(52) U.S. Cl.
CPC .......... *E21B 43/267* (2013.01); *C09K 8/62* (2013.01); *C09K 8/685* (2013.01); *C09K 8/80* (2013.01);
(Continued)

(58) Field of Classification Search
None
See application file for complete search history.

(56) References Cited

U.S. PATENT DOCUMENTS

| 3,937,283 A | 2/1976 | Blauer et al. |
| 3,980,136 A | 9/1976 | Plummer et al. |

(Continued)

FOREIGN PATENT DOCUMENTS

| EP | 306546 | 3/1989 |
| FR | 2920435 | 8/2007 |

(Continued)

OTHER PUBLICATIONS

Van Poollen, H. K., "Productivity vs. Permeability Damage in Hydraulically Produced Fracture", Halliburton Oil Well Cementing Co., Duncan OK, presented at meeting of Southwestern District Division of Production, Dallas, TX, Mar. 1957; 8 pages.

(Continued)

*Primary Examiner* — Andrew Sue-Ako
(74) *Attorney, Agent, or Firm* — Fish & Richardson P.C.

(57) ABSTRACT

Fracturing a reservoir includes providing a pad fluid to the reservoir via a wellbore in a well to create fractures in the reservoir, providing a fracturing fluid to the fractures via the wellbore, providing a geopolymer precursor fluid to the fractures via the wellbore, shutting in the wellbore at a wellbore pressure, thereby allowing the geopolymer precursor fluid to harden and form geopolymer proppant pillars in the fractures. Providing the geopolymer precursor fluid to the fractures includes pulsing quantities of the geopolymer precursor fluid into a continuous flow of the fracturing fluid or alternately pulsing quantities of the geopolymer precursor fluid and the fracturing fluid. An elapsed time between pulsing the quantities of the geopolymer precursor fluid is between 2 seconds and 20 minutes.

24 Claims, 4 Drawing Sheets

(51) Int. Cl.
  *C09K 8/68* (2006.01)
  *C09K 8/62* (2006.01)
  *C09K 8/66* (2006.01)
  *C09K 8/70* (2006.01)

(52) U.S. Cl.
  CPC .............. *C09K 8/665* (2013.01); *C09K 8/70* (2013.01); *C09K 2208/08* (2013.01); *C09K 2208/30* (2013.01)

(56) References Cited

U.S. PATENT DOCUMENTS

| | | |
|---|---|---|
| 4,044,833 A | 8/1977 | Volz |
| 4,216,829 A | 8/1980 | Murphy |
| 4,836,284 A | 6/1989 | Tinker |
| 4,846,277 A | 7/1989 | Khalil et al. |
| 5,069,283 A | 12/1991 | Mack |
| 5,529,123 A | 6/1996 | Carpenter et al. |
| 5,613,555 A | 3/1997 | Sorem et al. |
| 5,912,219 A | 6/1999 | Carrie et al. |
| 6,207,620 B1 | 3/2001 | Gonzalez et al. |
| 6,729,409 B1 | 5/2004 | Gupta et al. |
| 7,001,872 B2 | 2/2006 | Pyecroft et al. |
| 7,063,150 B2 | 6/2006 | Slabaugh et al. |
| 7,134,497 B1 | 11/2006 | Chatterji et al. |
| 7,252,146 B2 | 8/2007 | Slabaugh et al. |
| 7,281,581 B2 | 10/2007 | Nguyen et al. |
| 7,426,961 B2 | 9/2008 | Stephenson et al. |
| 7,581,590 B2 | 9/2009 | Lesko |
| 7,610,962 B2 | 11/2009 | Fowler |
| 7,767,628 B2 | 8/2010 | Kippie et al. |
| 8,584,755 B2 | 11/2013 | Willberg et al. |
| 8,763,699 B2 | 7/2014 | Medvedev et al. |
| 8,985,213 B2 | 3/2015 | Saini et al. |
| 9,080,440 B2 | 7/2015 | Panga |
| 9,181,789 B2 | 11/2015 | Nevison |
| 9,447,673 B2 | 9/2016 | Medvedev et al. |
| 9,725,639 B2 | 8/2017 | Vo et al. |
| 9,863,231 B2* | 1/2018 | Hull ................ E21B 43/267 |
| 2004/0173244 A1 | 9/2004 | Strothoff et al. |
| 2005/0137094 A1 | 6/2005 | Weaver et al. |
| 2006/0035808 A1 | 2/2006 | Ahmed et al. |
| 2006/0073980 A1 | 4/2006 | Brannon et al. |
| 2007/0012437 A1 | 1/2007 | Clingman et al. |
| 2008/0135242 A1 | 6/2008 | Lesko |
| 2008/0149329 A1* | 6/2008 | Cooper ............ E21B 43/267 166/250.01 |
| 2009/0044945 A1 | 2/2009 | Willberg et al. |
| 2009/0151944 A1 | 6/2009 | Fuller et al. |
| 2009/0298720 A1 | 12/2009 | Nguyen et al. |
| 2010/0043823 A1 | 2/2010 | Lee |
| 2010/0282468 A1 | 11/2010 | Willberg et al. |
| 2012/0018143 A1 | 1/2012 | Lembcke |
| 2012/0125618 A1 | 5/2012 | Willberg |
| 2012/0247764 A1 | 10/2012 | Panga |
| 2012/0305247 A1* | 12/2012 | Chen ................ C09K 8/74 166/280.1 |
| 2013/0260649 A1 | 10/2013 | Thomson |
| 2014/0000899 A1 | 1/2014 | Nevison |
| 2014/0131040 A9 | 5/2014 | Panga |
| 2014/0144633 A1 | 5/2014 | Nguyen |
| 2014/0144634 A1* | 5/2014 | Nguyen ............ E21B 43/261 166/281 |
| 2014/0144635 A1 | 5/2014 | Nguyen |
| 2014/0290943 A1* | 10/2014 | Ladva ............ E21B 43/267 166/280.1 |
| 2014/0352954 A1 | 12/2014 | Lakhtychkin et al. |
| 2015/0083420 A1 | 3/2015 | Gupta et al. |
| 2015/0211346 A1 | 7/2015 | Potapenko |
| 2015/0369028 A1 | 12/2015 | Potapenko |
| 2016/0153274 A1 | 6/2016 | Hull et al. |
| 2016/0215604 A1 | 7/2016 | Potapenko et al. |
| 2016/0319189 A1 | 11/2016 | Dusterhoft |
| 2016/0347994 A1 | 12/2016 | Purdy et al. |
| 2017/0121593 A1 | 5/2017 | Pantsurkin |

FOREIGN PATENT DOCUMENTS

| | | |
|---|---|---|
| GB | 2063840 | 6/1981 |
| WO | 2006108161 | 10/2006 |
| WO | 2016108161 | 10/2006 |
| WO | 2010026553 | 3/2010 |
| WO | 2015012818 | 1/2015 |
| WO | 2016032578 | 3/2016 |
| WO | 2017040553 | 3/2017 |

OTHER PUBLICATIONS

Barree, R.D. et al., "Realistic Assessment of Proppant Pack Conductivity for Material Selection", Presented at the Annual Technical Conference, Denver, Colorado, USA, Oct. 5-8; Society of Petroleum Engineers, 2003, Paper SPE-84306; http://dx.doi.org/10.2118/84306-MS; 12 pages.

Palisch, Terry et al., "Determining Realistic Fracture Conductivity and Understanding its Impact on Well Performance—Theory and Field Examples", Presented at the 2007 Hydraulic Fracturing Technology Conference, College Station, TX, USA, Jan. 29-31, 2007; Society of Petroleum Engineers, 2007, Paper SPE-106301; http://dx.doi.org/10.2118/106301-MS; 13 pages.

Gomaa, Ahmed M. et al., "Improving Fracture Conductivity by Developing and Optimizing Channels within the Fracture Geometry: CFD Study", presented at SPE International Conference on Formation Damage Control in Lafayette, LA, USA, Feb. 24-26; Society of Petroleum Engineers, 2016, Paper SPE-178982-MS; http://dx.doi.org/10.2118/178982-MS; 25 pages.

Gillard, M. et al., "A New Approach to Generating Fracture Conductivity", Presented at the SPE Annual Technical Conference and Exhibition held in Florence, Italy, Sep. 20-22; Society of Petroleum Engineers, 2010, Paper SPE-135034; http://dx.doi.org/10.2118/135034-MS; 13 pages.

Vincent, M.C.., "Five Things You Didn't Want to Know About Hydraulic Fractures", Chapter 4, Presented at Proceedings of the International Conference for Effective and Sustainable Hydraulic Fracturing, Brisbane Austrialia, May 2013; http://dx.doi.org/10.5772/56066; 14 pages.

Poollen, H.K. et al., "Hydraulic Fracturing—Fracture Flow Capacity vs. Well Productivity", Halliburton Oil Well Cementing Co., Duncan, OK; Presented at 32nd Annual Fall Meeting of Society of Petroleum Engineers in Dallas; TX, Oct. 6-9, 1957, vol. 213, 1958, Paper SPE-890-G; 5 pages.

Kern, L.R. et al., "Propping Fractures with Aluminum Particles", Journal of Petroleum Technology, Jun. 1961, pp. 583-589, Paper SPE-1573-G; http://dx.doi.org/10.2118/1573-G-PA; 7 pages.

Tinsley, J.M. et al., "A New Method for Providing Increased Fracture conductivity and Improving Stimulation Results"; Journal of Petroleum Technology, Nov. 1975, pp. 1319-1325; http://dx.doi.org/10.2118/4676-PA; 7 pages.

Mayerhofer, M. J. et al., "Proppants? We Don't Need No Proppants", Presented at the SPE Annual Technical Conference and Exhibition, Oct. 5-7, 1997, San Antonio TX; Society of Petroleum Engineers, Inc. 1997, pp. 457-464, Paper SPE-38611; http://dx.doi.org/10.2118/38611-MS; 8 pages.

Vincent, M.C., "Examining Our Assumptions—Have Oversimplifications Jeopardized Our Ability to Design Optimal Fracture Treatments?", Presented at the SPE Hydraulic Fracturing Technology Conference, The Woodlands, USA, Jan. 19-21, 2009, Society of Petroleum Engineers 2009, Paper SPE-119143; http://dx.doi.org/10.2118/119143-MS; 51 pages.

Meyer, Bruce R. et al., "Theoretical Foundation and Design Formulae for Channel and Pillar Type Propped Fractures—A Method to Increase Fracture Conductivity", Presented at SPE Annual Technical Conference and Exhibition, Amsterdam, The Netherlands, Oct. 27-29, 2014; Society of Petroleum Engineers 2014, Paper SPE-170781-MS; http://dx.doi.org/10.2118/170781-MS; 25 pages.

Gomaa, Ahmed M., et al., "Computational Fluid Dynamics Applied to Investigate Development and Optimization of Highly Conductive Channels within the Fracture Geometry", Presented at the SPE Hydraulic Fracturing Technology Conference, The Woodlands, Texas,

(56) References Cited

OTHER PUBLICATIONS

USA, Feb. 9-11, 2016; Society of Petroleum Engineers 2016, Paper SPE-179143-MS; http://dx.doi.org/10.2118/179143-MS; 18 pages.
International Search Report and Written Opinion issued in International Application No. PCT/US2018/051627 dated Nov. 27, 2018, 13 pages.
International Search Report and Written Opinion issued in International Application No. PCT/US2018/062426 dated Jan. 29, 2019, 15 pages.
Invitation to Pay Additional Fees and, Where Applicable, Protest Fee issued in PCT/US2018/031492 dated Aug. 3, 2018, 16 pages.
International Search Report issued in International Application No. PCT/US2018/031492 dated Sep. 24, 2018, 22 pages.
Gomaa et al., "Acid Fracturing: The Effect of Formation Strength on Fracture Conductivity," Paper SPE 119623 presented at the SPE Hydraulic Fracturing Technology Conference, Jan. 2009, 18 pages.
Williams et al., "Acidizing Fundamentals," Society of Petroleum Engineers of AIME, Jan. 1979, 131 pages.

\* cited by examiner

PULSED HYDRAULIC FRACTURING WITH GEOPOLYMER PRECURSOR FLUIDS

TECHNICAL FIELD

This invention relates to pulsed hydraulic fracturing of a reservoir with geopolymer precursor fluids to yield isolated geopolymer proppant pillars in the reservoir.

BACKGROUND

The success of a fracturing stimulation treatment depends at least in part on the strength and distribution of the proppant used to prevent the created fracture from closing after treatment. Even for simple and wide features with high proppant placement efficiency throughout the entire fracture geometry, current mathematical and engineering concepts still overestimate the flow capacity of fractures by orders of magnitude. Permeability of the proppant pack may be reduced by a combination of factors such as residual damage from poor gel recovery, fines migration, multiphase flow, fluid momentum losses, drag forces, capillary forces, and proppant crushing and embedment. In some cases, conventional proppant packs lose up to 99% of initial conductivity due to gel damage, fines migration, multiphase flow, and non-Darcy flow.

SUMMARY

In a first general aspect, fracturing a reservoir includes providing a pad fluid to the reservoir via a wellbore in a well to create fractures in the reservoir, providing a fracturing fluid to the fractures via the wellbore, providing a geopolymer precursor fluid to the fractures via the wellbore, and shutting in the wellbore at a wellbore pressure, thereby allowing the geopolymer precursor fluid to harden and form geopolymer proppant pillars in the fractures. Providing the geopolymer precursor fluid to the fractures includes pulsing quantities of the geopolymer precursor fluid into a continuous flow of the fracturing fluid or alternately pulsing quantities of the geopolymer precursor fluid and the fracturing fluid. An elapsed time between pulsing the quantities of the geopolymer precursor fluid is between 2 seconds and 20 minutes.

Implementations of the first general aspect may include one or more of the following features.

The pad fluid may include slickwater, a linear gel, a crosslinked gel, or a viscoelastic surfactant fluid. The fracturing fluid may include slickwater, a linear gel, a crosslinked gel, or a viscoelastic surfactant fluid. In some cases, the fracturing fluid includes a proppant loading of up to 12 pounds per gallon added.

The geopolymer precursor fluid typically includes aluminosilicate, an alkaline reagent, and a permeability enhancing agent. The aluminosilicate may include at least one of calcined clay, kaolinitic clay, lateritic clay, volcanic rock, mine tailings, blast furnace slag, and coal fly ash. The alkaline reagent may include at least one of sodium silicate and potassium silicate. The permeability enhancing agent may include polylactic acid, such as polylactic acid in the form of beads, fibers, or fabric. The permeability enhancing agent may include at least one of a resin, a salt, benzoic acid, and wax beads. The salt may include an acid salt. The geopolymer precursor may also include an accelerating agent or a retarding agent. In some cases, the geopolymer precursor fluid is a first geopolymer precursor fluid, the fracturing fluid is a second geopolymer precursor fluid, and the first geopolymer precursor fluid and the second geopolymer precursor fluid differ in composition.

In some embodiments, the elapsed time between pulsing the quantities of the geopolymer precursor is between 10 seconds and 1 minute. In some embodiments, pulsing the quantities of the geopolymer precursor fluid includes pulsing discrete quantities of the geopolymer precursor fluid into the continuous flow of the fracturing fluid or alternately pulsing discrete quantities of the geopolymer precursor fluid and discrete quantities of the fracturing fluid. The discrete quantities of the geopolymer precursor fluid are typically spaced apart from each other. Pulsing the quantities of the geopolymer precursor fluid may include injecting the geopolymer precursor fluid at a rate between 1 barrel per minute and 120 barrels per minute, or injecting the geopolymer precursor fluid at a rate between 5 barrels per minute and 50 barrels per minute.

Implementations of the first general aspect may include, after providing the fracturing fluid and the geopolymer precursor fluid to the fractures, providing a continuous flow of an additional fluid to the fractures. In some cases, the geopolymer precursor fluid is a first geopolymer precursor fluid, and the additional fluid is a second geopolymer precursor fluid. In certain cases, the fracturing fluid is a first fracturing fluid, and the additional fluid is a second fracturing fluid. The second fracturing fluid may include a proppant loading of up to 12 pounds per gallon added.

In some embodiments, a compressive strength of the geopolymer proppant pillars exceeds an overburden pressure of the reservoir. The compressive strength of the geopolymer proppant pillars may be in a range of 500 pounds per square inch to 20,000 pounds per square inch. A permeability of the geopolymer proppant pillars may be in a range of 0.00001 Darcy to 20,000 Darcy.

Pulsed hydraulic fracturing with geopolymer precursor fluids yields increased productivity. Moreover, because the geopolymer precursor fluid hardens in the reservoir to form proppant pillars, the need for proppant is reduced or eliminated. Methods and systems described herein advantageously reduce proppant costs, pumping horsepower, and gel damage, when compared to conventional treatments. Methods and systems described herein also reduce the opportunity for proppant to screen out during pumping procedures.

DETAILED DESCRIPTION

To avoid loss of conductivity of a proppant pack in a reservoir, isolated proppant pillars are formed to support the fracture and keep it open. The isolated proppant pillars form conductive channels that provide a path having high conductivity for hydrocarbon flow. As described herein, stable proppant pillars are generated by providing pulses of a geopolymer precursor fluid within a compatible fracturing fluid or by alternating pulses of a geopolymer precursor fluid with pulses of a compatible fracturing fluid through the wellbore into the reservoir at fracture pressure. The geopolymer precursor fluid includes an aluminosilicate, an alkaline reagent, and a permeability enhancing agent. The pulsing injection pattern allows the geopolymer precursor fluid to fill the fractures in an isolated pattern shape, creating proppant pillars in the fractures. The geopolymer precursor fluid hardens in the reservoir to form geopolymer proppant pillars in the fractures.

Figure 1:
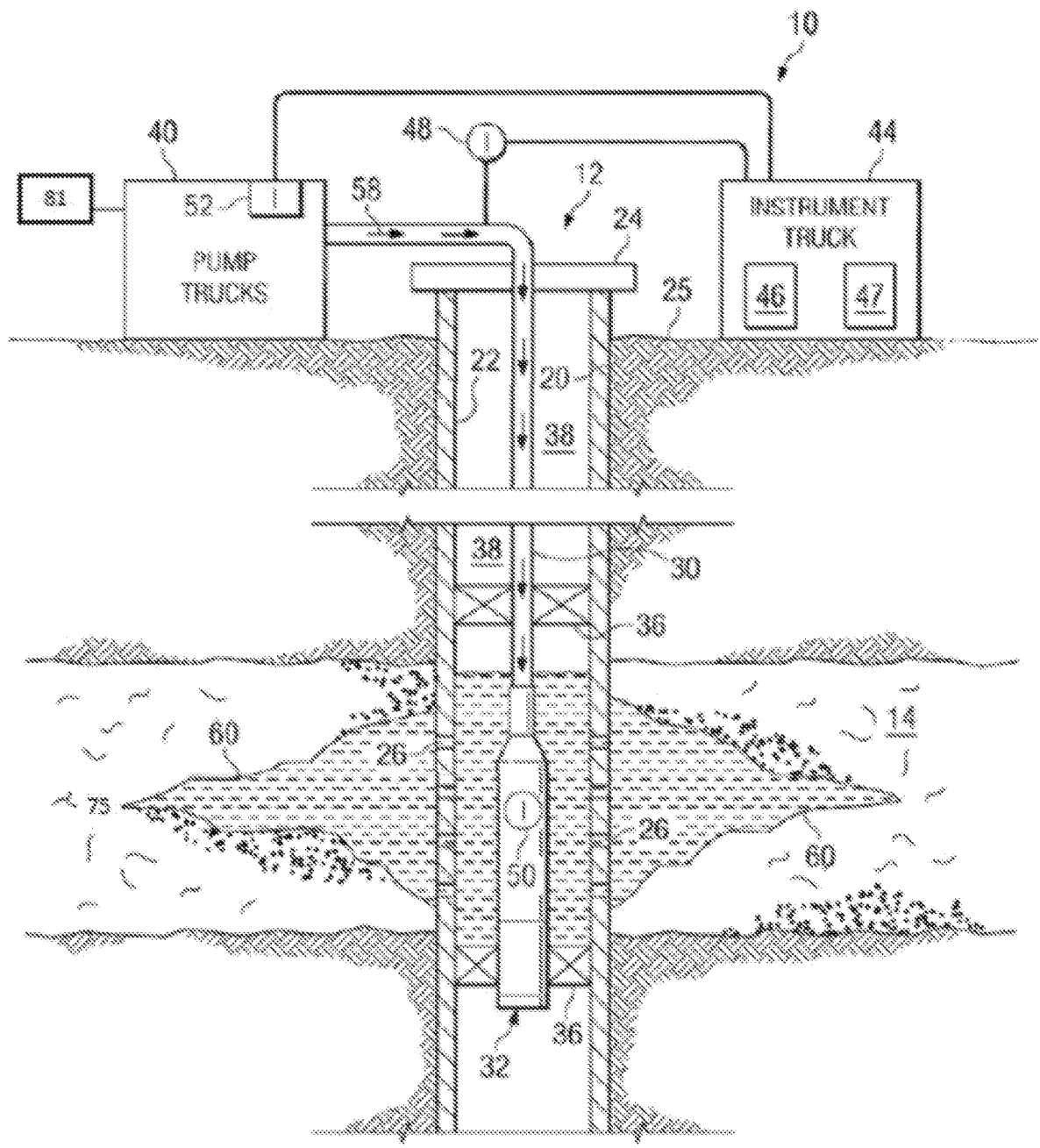
FIG. 1 depicts an exemplary hydraulic fracture treatment for a well.

FIG. 1 depicts an example of a fracture treatment 10 for a well 12. The well 12 can be a reservoir or formation 14, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, and gas-hydrate deposits. In some implementations, the formation 14 includes an underground formation of naturally fractured rock containing hydrocarbons (for example, oil, gas, or both). For example, the formation 14 can include a fractured shale. In some implementations, the well 12 can intersect other suitable types of formations 14, including reservoirs that are not naturally fractured in any significant amount.

The well 12 can include a wellbore 20, casing 22 and well head 24. The wellbore 20 can be a vertical or deviated bore. The casing 22 can be cemented or otherwise suitably secured in the wellbore 12. Perforations 26 can be formed in the casing 22 at the level of the formation 14 to allow oil, gas, and by-products to flow into the well 12 and be produced to the surface 25. Perforations 26 can be formed using shape charges, a perforating gun or otherwise.

For the fracture treatment 10, a work string 30 can be disposed in the wellbore 20. The work string 30 can be coiled tubing, sectioned pipe or other suitable tubing. A fracturing tool 32 can be coupled to an end of the work string 30. Packers 36 can seal an annulus 38 of the wellbore 20 above and below the formation 14. Packers 36 can be mechanical, fluid inflatable or other suitable packers.

One or more pump trucks 40 can be coupled to the work string 30 at the surface 25. The pump trucks 40 pump fluid 58 down the work string 30 to perform the fracture treatment 10 and generate the fracture 60. The fluid 58 can include a pad fluid, fracturing fluid, a geopolymer precursor fluid, other appropriate fluids, or any combination thereof. The pump trucks 40 can include mobile vehicles, equipment such as skids or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10 as well as to stop and start the pad phase, proppant phase and/or flush phase of the fracture treatment 10. The fracture control system 46 communicates with surface and/or subsurface instruments to monitor and control the fracture treatment 10. In some implementations, the surface and subsurface instruments may include surface sensors 48, down-hole sensors 50 and pump controls 52.

A quantity of energy applied by the fracture control system 46 to generate the fractures 60 in the reservoir or formation 14 can be affected not only by the properties of the reservoir rock in the formation but also by the organic matter (for example, kerogen 75) intertwined within the rock matrix.

Figure 2:
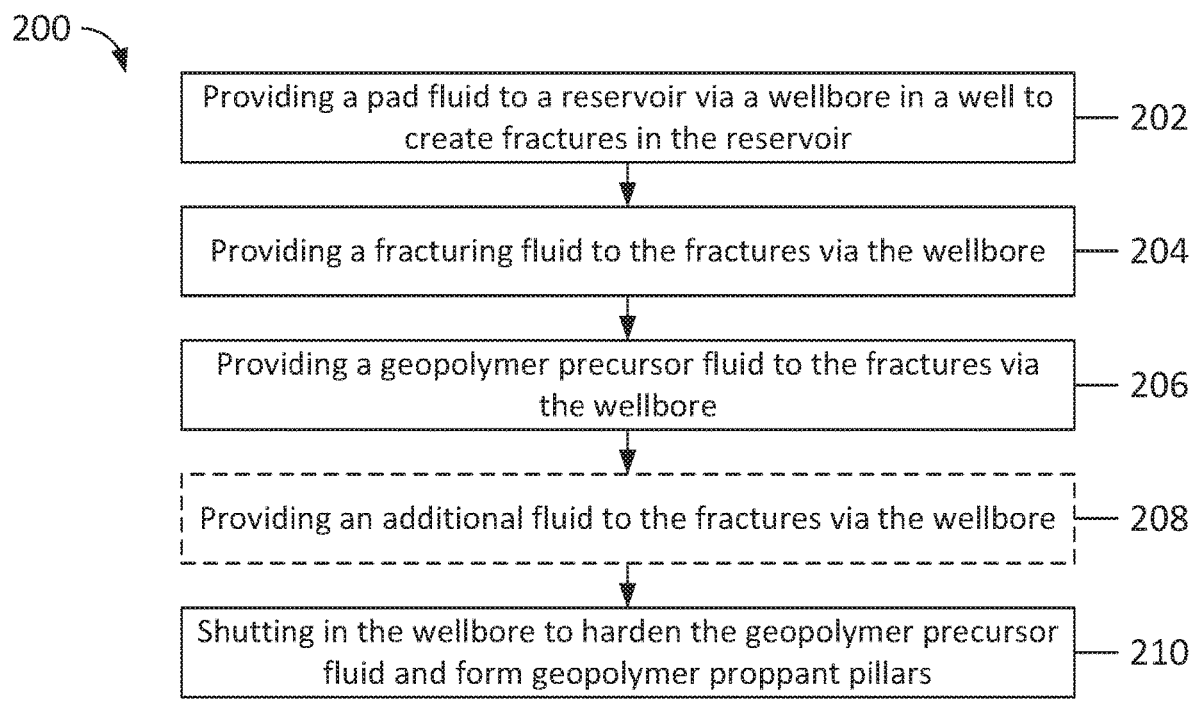
FIG. 2 is a flowchart for a method of pulsed hydraulic fracturing with a geopolymer precursor fluid.

FIG. 2 is a flowchart showing operations in process 200 for fracturing a reservoir with a geopolymer precursor fluid. The geopolymer precursor fluid is typically a solid-in-liquid dispersion including an aluminosilicate, an alkaline reagent, and a permeability enhancing agent, which can be present in a range of 0.1 vol % to 95 vol %, 0.1 vol % to 60 vol %, and 0 vol % to 95 vol %, respectively. An average particle diameter of solid components in the geopolymer precursor fluid is typically up to 0.1 μm or up to 1 cm. The geopolymer precursor fluid has a viscosity that allows it to flow inside fractures and minimize leak-off. At reservoir temperature viscosity can be in the range of 0.01 cP to 10000 cP. As such, the geopolymer precursor fluid can be used to create fractures in a reservoir.

Polymerization of the geopolymer precursor fluid yields a geopolymer. As used herein, "geopolymer" generally refers to an amorphous polymer having an Si—O—Al framework formed by polymerization of aluminosilicate. In some embodiments, a geopolymer is completely inorganic. In other embodiments, a geopolymer includes organic moieties. Components of the geopolymer precursor fluid may be selected to yield a geopolymer having a silicon (Si) to aluminum (Al) ratio (Si/Al ratio) between about 0.5:1 and about 2:1, between about 1:1 and about 2:1, between about 1:1 and about 1.5:1, or between about 0.5:1 and about 1:1.

The aluminosilicate in the geopolymer precursor fluid includes at least one of calcined clay, kaolinite, laterite, volcanic rock, mine tailings, blast furnace slag, and coal fly ash. In some embodiments, the aluminosilicate includes metakaolin, a dehydroxylated form of kaolinite. In some embodiments, the aluminosilicate includes low calcium fly ash (ASTM class F fly ash). In certain embodiments, calcium fly ash is preferred over high calcium fly ash (ASTM class C fly ash), due at least in part to interference of a large amount of calcium with the polymerization process and subsequent alteration of the microstructure of the solidified geopolymer. However, aluminosilicate with a greater amount of calcium can produce a geopolymer with higher compressive strength, due at least in part to the formation of calcium-aluminum-hydrates and other calcium compounds. In some embodiments, the aluminosilicate includes fly ash. Fly ash can be advantageously used as the aluminosilicate due at least in part to its fine particle size. The aluminosilicate may be selected based at least in part on color, particle size, and purity of the source material.

The alkaline reagent may include any alkaline reagent that reacts with aluminosilicate to yield a geopolymer. Exemplary alkaline reagents include aqueous solutions of sodium silicate, potassium silicate, calcium silicate, cesium silicate, sodium hydroxide, potassium hydroxide, and calcium hydroxide. Other suitable alkaline reagents include buffers such as hydroxides, carbonates, bicarbonates, amines, or a combination thereof.

Permeability enhancing agents include components that create conductive void spaces within proppant pillars formed by the geopolymer precursor fluid. Permeability enhancing agents include components that decompose under ambient conditions in the reservoir, water-soluble components that dissolve in water present in the reservoir, reactants that release gas or foam in the geopolymer precursor fluid, and vegetable oil. Examples of permeability enhancing agents include polylactic acid (e.g., in the form of beads, fiber, or fabric), resins, salts, benzoic acid, and wax beads. Suitable salts include sodium chloride, calcium chloride, potassium chloride, and the like.

In some embodiments, the geopolymer precursor fluid includes an accelerating agent to accelerate formation of the geopolymer in the reservoir. Examples of suitable accelerating agents include reagents that increase a pH of the fluid, such as such as hydroxides, carbonates, bicarbonates, amines, or a combination thereof.

In some embodiments, the geopolymer precursor fluid includes a retarding agent to retard formation of the geopolymer in the reservoir. Suitable retarding agents include esters that generate acids. Examples of suitable retarding agents include polylactic acid, ethyl ethanoate, ethyl propanoate, propyl methanoate, methyl butanate, and propyl ethanoate.

Referring again to FIG. 2, in 202, a pad fluid is provided to the reservoir via a wellbore to create fractures in the reservoir. Suitable pad fluids include slickwater, linear gels, crosslinked gels, and viscoelastic surfactant fluids. "Slickwater" generally refers to a low-viscosity fluid pumped at a high rate to generate narrow, complex fractures with low-concentrations of propping agent. "Linear gel" generally refers to an uncrosslinked solution of polysaccharides such as guar, derivatized-guar, HEC, or xanthan and having a viscosity of up to about 100 cP at surface temperature. "Crosslinked gel" generally refers to polysaccharides such as guar, derivatized-guar, HEC, or xanthan crosslinked with a crosslinker such as boron, zirconium, titanium, or aluminum, and having a viscosity of about 100 cP to about 1000 cP at surface temperature. "Viscoelastic surfactant fluid" generally refers to a polymer-free fluid that generates a viscosity suitable for fracturing operations without the use of polymer additives. In some embodiments, the pad fluid is a geopolymer precursor fluid.

In 204, a fracturing fluid is provided to the fractures via the wellbore. Suitable fracturing fluids include slickwater, linear gels, crosslinked gels, and viscoelastic surfactant fluids. In some embodiments, the fracturing fluid is a geopolymer precursor fluid. The fracturing fluid may include a proppant loading of up to about 12 pounds per gallon added.

The proppant may be a resin-coated proppant, an encapsulated resin, or a combination thereof. A proppant is a material that keeps an induced hydraulic fracture at least partially open during or after a fracturing treatment. Proppants can be transported into the reservoir and to the fractures using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, in which particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.000,1 wt % to about 99.9 wt %, about 0.1 wt % to about 80 wt %, or about 10 wt % to about 60 wt %, or about 0.000,000,01 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

In 206, a geopolymer precursor fluid is provided to the fractures via the wellbore. In some embodiments, providing the geopolymer precursor fluid to the fractures includes pulsing quantities of the geopolymer precursor fluid into a continuous flow of the fracturing fluid. The quantities of the geopolymer precursor fluid may be discrete quantities that are spaced apart from each other. Pulsing quantities of the geopolymer precursor fluid into a continuous flow of the fracturing fluid may be achieved by fracturing pumps. In some embodiments, providing the geopolymer precursor fluid to the fractures includes alternately pulsing quantities of the geopolymer precursor fluid and the fracturing fluid. The quantities of the geopolymer precursor fluid may be discrete quantities that are spaced apart from each other by the quantities of the fracturing fluid, and vice versa.

Pulsing the quantities of the geopolymer precursor fluid may include injecting the geopolymer precursor fluid at a rate between 1 barrel per minute and 120 barrels per minute, or between 5 barrels per minute and 50 barrels per minute for a pumping time between 2 seconds and 10 minutes, or between 10 seconds and 1 minute. Pulsing the quantities of the fracturing fluid may include injecting the fracturing fluid at a rate between 1 barrel per minute and 120 barrels per minute, or between 5 barrels per minute and 50 barrels per minute for a pumping time between 2 seconds and 10 minutes, or between 10 seconds and 1 minute.

In some embodiments, the fracturing fluid in 204 is a geopolymer precursor fluid that differs in composition from the geopolymer precursor fluid in 206. In certain embodiments, the fracturing fluid in 204 includes different chemical components than the geopolymer precursor fluid in 206. In certain embodiments, the fracturing fluid in 204 includes the same components as the geopolymer precursor fluid in 206 in different concentrations.

In 208, an additional fluid is optionally provided to the fractures via the wellbore. The additional fluid is typically provided continuously (not pulsed). The additional fluid is typically a fracturing fluid. The fracturing fluid can include a proppant. In one example, the proppant loading is up to about 12 pounds per gallon. In some embodiments, the additional fluid is a geopolymer precursor fluid. The geopolymer precursor fluid may differ in composition from the geopolymer precursor fluid in 206. In certain embodiments, the additional fluid in 208 includes different chemical components than the geopolymer precursor fluid in 206. In certain embodiments, the additional fluid in 208 includes the same components as the geopolymer precursor fluid in 206 in different concentrations.

In 210, the wellbore is shut in at a wellbore pressure, thereby allowing the geopolymer precursor fluid to harden and to form geopolymer proppant pillars in the fractures.

Figure 3A:
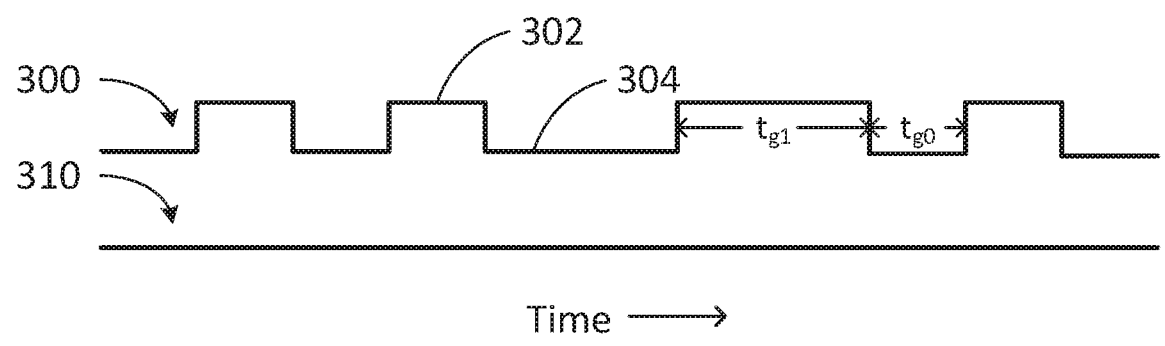
FIG. 3A depicts elapsed time between pulsed quantities of geopolymer precursor fluid in a continuous flow of fracturing fluid.

FIG. 3A depicts elapsed time between pulsed quantities of geopolymer precursor fluid in a continuous flow of fracturing fluid as a function of time. Waveform 300 represents the pulsed flow of geopolymer precursor fluid, and waveform 310 represents the continuous flow of fracturing fluid. Geopolymer injection segments 302 of waveform 300 correspond to operation of the pump that injects the geopolymer precursor fluid ("pump on"). A duration $t_{g1}$ of geopolymer injection segments 302 is typically in a range of 2 seconds to 10 minutes, or between 10 seconds and 1 minute, and can be the same or different for one or more geopolymer injection segments. Geopolymer injection segments 302 are separated in time by geopolymer noninjection segments 304. Geopolymer noninjection segments 304 correspond to cessation of the pump that injects the geopolymer precursor fluid ("pump off"). A duration $t_{g0}$ of geopolymer noninjection segments 304, is typically in a range of 2 seconds to 20 minutes.

Figure 3B:
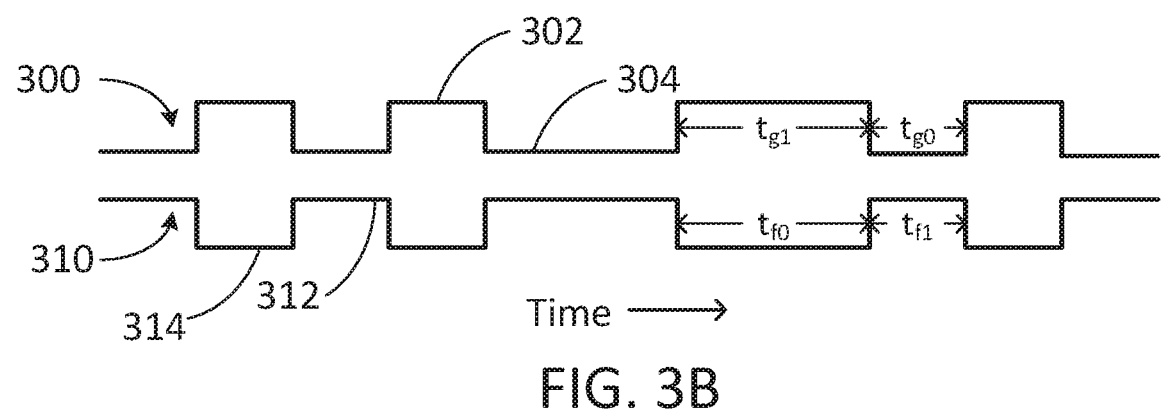
FIGS. 3B-3D depict elapsed time between pulsed quantities of geopolymer precursor fluid and fracturing fluid.

FIG. 3B depicts elapsed time between pulsed quantities of geopolymer precursor fluid and fracturing fluid. Waveform 300 represents the pulsed flow of geopolymer precursor fluid, and waveform 310 represents the pulsed flow of fracturing fluid. Geopolymer injection segments 302 of waveform 300 correspond to operation of the pump that injects the geopolymer precursor fluid ("pump on"). A duration to of geopolymer injection segments 302 is typically in a range of 2 seconds to 10 minutes, or 10 seconds to 1 minute, and can be the same or different for one or more geopolymer injection segments. Geopolymer injection segments 302 are separated in time by geopolymer noninjection segments 304. Geopolymer noninjection segments 304 correspond to cessation of the pump that injects the geopolymer precursor fluid ("pump off"). A duration $t_{g0}$ of geopolymer noninjection segments 304, is typically in a range of 2 seconds to 20 minutes. Fracturing fluid injection segments 312 of waveform 310 correspond to operation of the pump that injects the fracturing fluid ("pump on"). A duration $t_{f1}$ of fracturing fluid injection segments 312 is typically in a range of 2 seconds to 10 minutes, or 10 seconds to 1 minute, and can be the same or different for one or more fracturing fluid injection segments. Fracturing fluid injection segments 312 are separated in time by fracturing fluid noninjection segments 314. Fracturing fluid noninjection segments 314 correspond to cessation of the pump that injects the fracturing fluid ("pump off"). A duration $t_{f0}$ of fracturing fluid noninjection segments 314, is typically in a range of 2 seconds to 15 minutes. As depicted in FIG. 3B, geopolymer injection segments 302 correspond to fracturing fluid noninjection segments 314, and geopolymer noninjection segments 304 correspond to fracturing fluid injection segments 312.

Figure 3C:
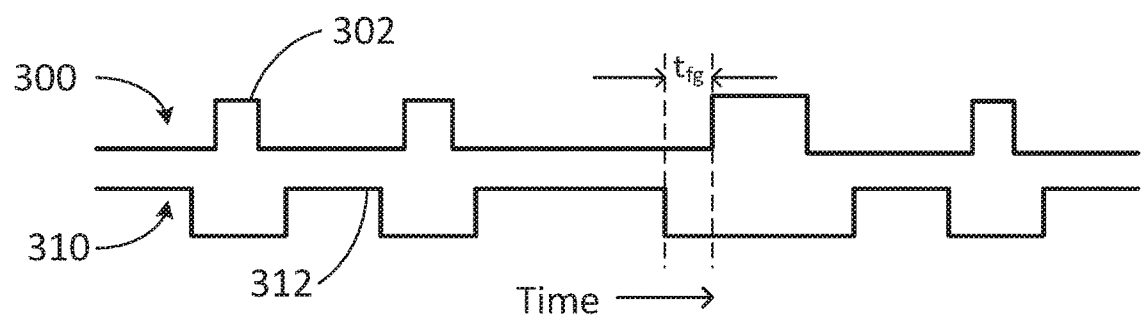

In some embodiments, geopolymer injection segments 302 and fracturing fluid injection segments 312 may be separated in time by a duration $t_{fg}$. FIG. 3C depicts elapsed time between pulsed quantities of geopolymer precursor fluid and fracturing fluid. Waveform 300 represents the pulsed flow of geopolymer precursor fluid, and waveform 310 represents the pulsed flow of fracturing fluid. Elapsed time between geopolymer injection segments 302 and fracturing fluid injection segments 312, $t_{fg}$, may be the same or different, and is typically in a range of 2 seconds to 15 minutes.

Figure 3D:
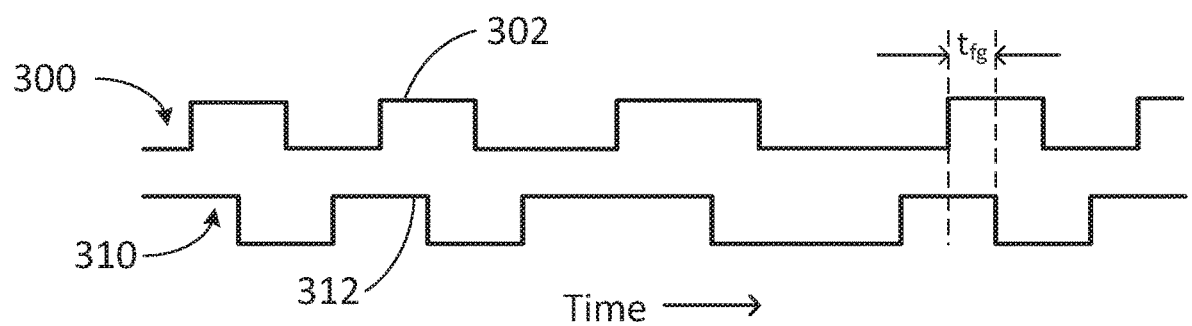

In some embodiments, geopolymer injection segments 302 and fracturing fluid injection segments 312 may overlap in time by a duration $t_{fg}$. FIG. 3D depicts elapsed time between pulsed quantities of geopolymer precursor fluid and fracturing fluid. Waveform 300 represents the pulsed flow of geopolymer precursor fluid, and waveform 310 represents the pulsed flow of geopolymer precursor fluid. A duration of the overlap between geopolymer injection segments 302 and fracturing fluid injection segments 312, $t_{fg}$, may be the same or different, and is typically in a range of 2 seconds to 20 minutes.

In certain embodiments, geopolymer injection segments and fracturing fluid injection segments may be separated in time, overlap in time, or any combination thereof.

Figure 4:
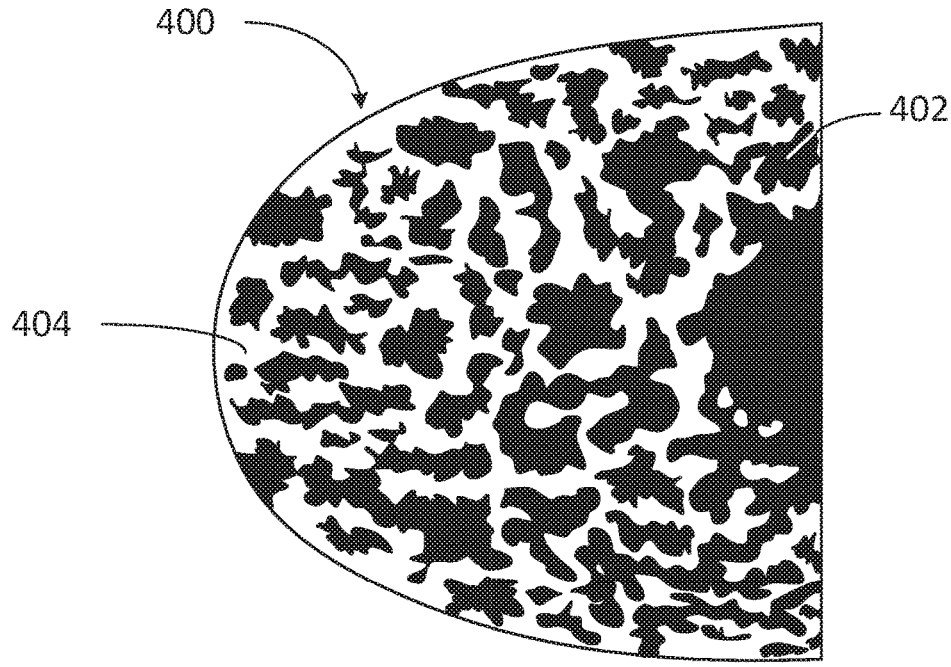
FIG. 4 depicts a cross-sectional view of geopolymer proppant pillars in a fracture.

FIG. 4 depicts a fracture 400 with geopolymer proppant pillars 402 and conductive channels 404 between the pillars.

In some embodiments, an accelerating agent is included in the geopolymer precursor fluid to reduce the length of time required to polymerize the geopolymer precursor fluid to yield a geopolymer. In some embodiments, a retarding agent is included in the geopolymer precursor fluid to increase the length of time required to polymerize the geopolymer precursor fluid to yield a geopolymer. Suitable curing and shut-in times range from less than an hour (e.g., half an hour) to days (e.g., 20 days).

A compressive strength of the geopolymer proppant pillars may exceed the overburden pressure of the reservoir. In some embodiments, a compressive strength of the geopolymer proppant pillars is in a range of about 500 psi to about 20,000 psi. In some embodiments, a permeability of the geopolymer pillars is about 0.01 mD to about 20,000 D.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of fracturing a reservoir, the method comprising:
    injecting a pad fluid and a fracturing fluid into the reservoir via a wellbore in a well to create fractures in the reservoir;
    pulsing quantities of a geopolymer precursor fluid into a continuous flow of the fracturing fluid or alternately pulsing quantities of the geopolymer precursor fluid and the fracturing fluid, and an elapsed time between pulsing the quantities of the geopolymer precursor fluid is between 2 seconds and 20 minutes, wherein the fracturing fluid does not comprise proppant;
    after providing the fracturing fluid and the geopolymer precursor fluid to the fractures, providing a flow of a second fracturing fluid to the fractures, wherein the second fracturing fluid comprises a proppant loading of up to 12 pounds per gallon added; and
    shutting in the wellbore at a wellbore pressure, thereby allowing the geopolymer precursor fluid to polymerize and harden in the fractures and form geopolymer proppant pillars.

2. The method of claim 1, wherein the pad fluid comprises slickwater, a linear gel, a crosslinked gel, or a viscoelastic surfactant fluid.

3. The method of claim 1, wherein injecting the fracturing fluid comprises pumping the fracturing fluid to apply energy to create the fractures, wherein the fracturing fluid comprises slickwater, a linear gel, a crosslinked gel, or a viscoelastic surfactant fluid, and wherein the geopolymer precursor fluid does not comprise proppant.

4. The method of claim 1, wherein the geopolymer precursor fluid comprises aluminosilicate, an alkaline reagent, and a permeability enhancing agent, and wherein the geopolymer precursor fluid does not comprise proppant, and wherein the fracturing fluid is slickwater or a viscoelastic surfactant fluid.

5. The method of claim 4, wherein the aluminosilicate comprises at least one of calcined clay, kaolinitic clay, lateritic clay, volcanic rock, mine tailings, blast furnace slag, or coal fly ash, and wherein the alkaline reagent comprises at least one of sodium silicate or potassium silicate, and wherein the fracturing fluid is slickwater.

6. The method of claim 4, wherein the permeability enhancing agent comprises polylactic acid.

7. The method of claim 6, wherein the polylactic acid is in the form of beads, fibers, or fabric.

8. The method of claim 4, wherein the permeability enhancing agent comprises at least one of an acid salt, benzoic acid, and wax beads.

9. The method of claim 4, wherein the geopolymer precursor further comprises an accelerating agent.

10. The method of claim 4, wherein the geopolymer precursor further comprises a retarding agent.

11. The method of claim 1, wherein the elapsed time between pulsing the quantities of the geopolymer precursor is between 10 seconds and 1 minute, and wherein the fracturing fluid does not comprise a linear gel or a cross-linked gel.

12. The method of claim 1, wherein pulsing the quantities of the geopolymer precursor fluid comprises pulsing discrete quantities of the geopolymer precursor fluid into the continuous flow of the fracturing fluid or alternately pulsing discrete quantities of the geopolymer precursor fluid and discrete quantities of the fracturing fluid.

13. The method of claim 1, wherein the geopolymer precursor fluid is a first geopolymer precursor fluid, and the fracturing fluid comprises a second geopolymer precursor fluid, wherein the first geopolymer precursor fluid and the second geopolymer precursor fluid differ in composition.

14. The method of claim 1, wherein pulsing the quantities of the geopolymer precursor fluid comprises injecting the geopolymer precursor fluid at a rate between 1 barrel per minute and 120 barrels per minute, and wherein proppant is not transported to the fractures.

15. The method of claim 12, wherein the discrete quantities of the geopolymer precursor fluid are spaced apart from each other.

16. The method of claim 14, wherein pulsing the quantities of the geopolymer precursor fluid comprises injecting the geopolymer precursor fluid at a rate between 5 barrels per minute and 50 barrels per minute.

17. The method of claim 1, wherein the flow of the second fracturing fluid comprises a continuous flow of the second fracturing fluid to the fractures.

18. The method of claim 17, wherein the geopolymer precursor fluid is a first geopolymer precursor fluid, and the second fracturing fluid is a second geopolymer precursor fluid.

19. The method of claim 17, wherein the second fracturing fluid to form fractures in the reservoir, and wherein the second fracturing fluid is not pulsed.

20. The method of claim 1, wherein a compressive strength of the geopolymer proppant pillars exceeds an overburden pressure of the reservoir.

21. The method of claim 20, wherein the compressive strength of the geopolymer proppant pillars is in a range of 500 pounds per square inch to 20,000 pounds per square inch, and wherein a permeability of the geopolymer proppant pillars is in a range of 0.00001 Darcy to 20,000 Darcy.

22. A method of fracturing a reservoir, the method comprising:
injecting a fracturing fluid into the reservoir via a wellbore to create fractures in the reservoir, wherein the fracturing fluid is slickwater or a viscoelastic surfactant fluid, and does not comprise proppant;
pulsing a geopolymer precursor fluid into a continuous flow of the fracturing fluid or alternately pulsing the geopolymer precursor fluid and the fracturing fluid, wherein an elapsed time between pulsing the geopolymer precursor fluid is between 2 seconds and 20 minutes, wherein the geopolymer precursor fluid comprises aluminosilicate, an alkaline reagent, and a permeability enhancing agent, and wherein the geopolymer precursor fluid does not comprise proppant;
after providing the fracturing fluid and the geopolymer precursor fluid to the fractures, providing a flow of a second fracturing fluid to the fractures, wherein the second fracturing fluid comprises a proppant loading of up to 12 pounds per gallon added; and
shutting in the wellbore at a wellbore pressure, thereby allowing the geopolymer precursor fluid to polymerize to form geopolymer proppant pillars in the fractures, wherein a compressive strength of the geopolymer proppant pillars exceeds an overburden pressure of the reservoir, and wherein a permeability of the geopolymer proppant pillars is in a range of 0.00001 Darcy to 20,000 Darcy.

23. A method of fracturing a reservoir, the method comprising:
injecting a fracturing fluid via a wellbore into the reservoir to create fractures in the reservoir, wherein the fracturing fluid does not comprise proppant;
injecting a geopolymer precursor fluid via the wellbore into the fractures in an isolated pattern shape in the fractures to form isolated geopolymer proppant pillars forming conductive channels for hydrocarbon flow, wherein injecting the geopolymer precursor fluid comprises pulsing the geopolymer precursor fluid into a continuous flow of the fracturing fluid or alternately pulsing the geopolymer precursor fluid and the fracturing fluid, wherein an elapsed time between pulsing the geopolymer precursor fluid is between 2 seconds and 20 minutes, wherein the geopolymer precursor fluid comprises aluminosilicate, an alkaline reagent, and a permeability enhancing agent, and wherein the geopolymer precursor fluid does not comprise proppant;
after providing the fracturing fluid and the geopolymer precursor fluid to the fractures, providing a continuous flow of a second fracturing fluid to the fractures, wherein the second fracturing fluid comprises a proppant loading of up to 12 pounds per gallon added; and
allowing the geopolymer precursor fluid to polymerize to yield a geopolymer to form the geopolymer proppant pillars in the fractures, wherein the geopolymer proppant pillars comprise a geopolymer proppant pillar not having proppant transported to the fractures.

24. The method of claim 23, wherein the fracturing fluid does not comprise a linear gel or a crosslinked gel, and wherein injecting the geopolymer precursor fluid during the pulsing of the geopolymer precursor fluid comprises injecting the geopolymer precursor fluid at a rate between 5 barrels per minute and 50 barrels per minute.

* * * * *